UNITED STATES PATENT OFFICE 2,426,891

N,N'-DIOCTADECYL-BETA-AMINO-PROPIONAMIDE

Kathryn L. Lynch, Stamford, Conn., assignor to American Cyanamid Company, New York, N. Y., a corporation of Maine No Drawing. Continuation of application Serial No. 472,386, January 14, 1943. This application filed September 14, 1945, Serial No. 616,461

1 Claim. (Cl. 260—561)

This invention relates to N,N'-dioctadecyl-$\beta$-amino-propionamide and to methods for the preparation thereof.

I have found that this compound can be prepared in good yields by reacting an acrylic acid ester of an aliphatic monohydric alcohol of low molecular weight with octadecylamine. I have also found that the compound so prepared possesses wetting properties and is, in addition, an excellent softening agent for cotton cloth. Because of the cationic activity of its acid salts in aqueous solutions it is also useful in ore-dressing operations involving acidic type materials.

In carrying out the reaction between the acrylic acid ester and octadecylamine a reaction temperature below about 150° C. and preferably between about 60 and 100° C. is employed. Two mols of the octadecylamine are preferably reacted with 1 mol of the lower alkyl ester of acrylic acid, such as methyl or ethyl acrylate, the reaction being continued until the conversion to the amide is substantially complete.

The following example is illustrative of a representative method for the preparation of the compound of the invention:

Example 265 g. (1 mol) of octadecylamine is melted and held at 64° C. while adding thereto 43 g. (0.5 mol) of methyl acrylate over a period of 30 minutes. Heat is applied and the mixture kept at 65 to 70° C. with agitation. Samples are taken from the reaction mixture from time to time and analyzed to show the progress of the reaction. The results are shown in the following table:

| Time of Heating | Conversion to the Amide | Temperature |
|---|---|---|
| Hours | Per unit | °C. |
| 3 | 18 | 68–70 |
| 7 | 78 | Raised to 93 |
| 10 | 90 | 90–95 |
| 12 | 98 | 90–95 |

287 g. of a soft waxy product is obtained after the removal of methanol by distillation. The product, N,N'-dioctadecyl-$\beta$-amino-propionamide, is dispersible in hot dilute acid to give surface-active solutions. When applied to cotton and rayon cloth excellent softening effects are attained.

The product may be dissolved in aqueous formaldehyde by adding 49 g. of it to 52 cc. of 40% formaline and diluting with 200 cc. of warm water. The thin creamy paste may be diluted with water if desired. This mixture also gives excellent softening when applied to cotton cloth.

This is a continuation of my copending application Serial No. 472,386 filed Jan. 14, 1943 which has become abandoned.

What I claim is:

N,N'-dioctadecyl-$\beta$-amino-propionamide.

KATHRYN L. LYNCH.

REFERENCES CITED

The following references are of record in the file of this patent:

UNITED STATES PATENTS

| Number | Name | Date |
|---|---|---|
| 2,168,253 | Balle et al. | Aug. 1, 1939 |

FOREIGN PATENTS

| Number | Country | Date |
|---|---|---|
| 450,692 | Great Britain | July 23, 1936 |
| 458,454 | Great Britain | Dec. 15, 1936 |

OTHER REFERENCES

Braun et al., "Ber. Deut. Chem.," vol. 60 (1927), pp. 347–354.

Dermer et al., "J. Org. Chem.," vol 8 (1943) p. 170.

Morsch in "Chemical Abstracts," vol. 28 (1934) pp. 2679 and 2680. (Abstract of Monatsh, vol. 63 (1933), pp. 220–235).